United States Patent [19]

Bezer et al.

[11] Patent Number: 4,464,331

[45] Date of Patent: Aug. 7, 1984

[54] TRANSFER AND POSITIONING APPARATUS FOR THE IRRADIATION OF TARGETS

[75] Inventors: Christian Bezer, Savigny-sur-Orge; Michel Rouet, Orsay, both of France

[73] Assignee: Commissariat a l'Energie Atomique, Paris, France

[21] Appl. No.: 281,399

[22] Filed: Jul. 8, 1981

[30] Foreign Application Priority Data

Jul. 10, 1980 [FR] France .............................. 80 15404

[51] Int. Cl.³ .................................... G21C 19/20
[52] U.S. Cl. .................................... 376/202; 376/270; 376/342; 250/453.1
[58] Field of Search ............ 376/270, 202, 340, 341, 376/342; 250/442.1, 443.1, 398–400, 441.1, 453.1

[56] References Cited

U.S. PATENT DOCUMENTS

| | | | |
|---|---|---|---|
| 2,504,585 | 4/1950 | Reid | 376/202 |
| 3,089,836 | 5/1963 | Wootton | 376/270 |
| 3,483,373 | 12/1969 | Asmus et al. | 250/441.1 |
| 3,567,576 | 3/1971 | Issac | 376/270 |
| 3,604,934 | 9/1971 | Melillo | 250/453.1 |
| 3,679,900 | 7/1972 | Kimura | 250/441.1 |
| 3,784,823 | 1/1974 | Kostic et al. | 250/453.1 |
| 3,955,692 | 5/1976 | Cody et al. | 376/270 |
| 4,018,348 | 4/1977 | Bosshard | 250/453.1 |
| 4,096,031 | 6/1978 | Wade | 376/270 |

FOREIGN PATENT DOCUMENTS

| | | | |
|---|---|---|---|
| 647527 | 5/1964 | Belgium | 376/341 |
| 44246 | 1/1982 | European Pat. Off. | 250/453.1 |
| 52-77998 | 6/1977 | Japan | 250/453.1 |
| 699855 | 11/1953 | United Kingdom | 376/202 |
| 999699 | 7/1965 | United Kingdom | 376/341 |

*Primary Examiner*—Sal Cangialosi
*Attorney, Agent, or Firm*—Oblon, Fisher, Spivak, McClelland & Maier

[57] ABSTRACT

Apparatus for the transfer and positioning of targets in an irradiation installation equipped with an access lock of axis $Z_3Z_4$ and within which there is a high vacuum, the installation being located in a protective enclosure defined by a shielded wall, including a telescopic assembly of axis $X_1X_2$ located within the protective enclosure, the telescopic assembly having a free end able to carry the target to be positioned and being located on a support, and the support can be given a movement enabling it to move between a first target handling position in which the satisfactory operation of its components can be checked and a second position in which the $X_1X_2$ axis of the telescopic assembly coincides with the $Z_3Z_4$ axis of the access lock and the free end introduced into the lock.

5 Claims, 7 Drawing Figures

TRANSFER AND POSITIONING APPARATUS FOR THE IRRADIATION OF TARGETS

BACKGROUND OF THE INVENTION

1. Field of the Invention

The present invention relates to a transfer and positioning apparatus for the irradiation of targets.

2. Description of the Prior Art

More particularly in the nuclear industry, a large number of installations exists located within a protective enclosure and into which is introduced a member, which is recovered after irradiation. These are constituted, for example, by particle accelerators, reactors, sources, etc.

Outside the nuclear industry, installations are generally known which are located within a protective enclosure protecting the operator against a hostile environment and into which an element is introduced from outside the enclosure without fracturing the tight protection against the hostile environment.

An installation of this type is, for example, an installation for irradiation by cyclotron constituted by a vacuum enclosure within which is positioned the part to be introduced, in this case a target to be irradiated. The placing of a target in a cyclotron its positioning for irradiation and its recovery after irradiation make it necessary for operators to be present in the protective enclosure, which contains the installation for irradiation by cyclotron. Thus, these operators are exposed to the hostile environment, e.g. irradiation in the case of a nuclear installation.

Remote manipulation means are known, which make it possible for an operator positioned outside a protective enclosure, to carry out a certain number of operations within the enclosure whilst being effectively protected, particularly against irradiation in the case of a nuclear installation. A remote manipulator of this type is, for example, described in French Pat. No. 74 25055, filed on July 18th 1974 by the Commissariat à l'Energie Atomique and entitled "Cable-driven, motor-operated manipulator".

However, such means do not make it possible to introduce a member, e.g. a target to be irradiated from the outside of the protective enclosure without fracturing the seal of the installation. Thus, a very high vacuum exists within the cyclotron irradiation installation. It must be possible to introduce the target into the installation and then recover it after irradiation without breaking the vacuum present inside said installation.

SUMMARY OF THE INVENTION

The invention relates to an apparatus for transferring and positioning targets to be irradiated which makes it possible to solve the problems posed as a result of the need to protect the operator from the radiation, as well as the sealing of the installation for irradiation by cyclotron and which is under a high vacuum. The invention makes it possible to transfer targets to be irradiated, their fitting, their positioning for irradiation, recovery after irradiation, as well as the regulation and control of the satisfactory operation of the positioning means, whilst ensuring that the operators are completely protected from irradiation.

The invention more specifically relates to an apparatus for the transfer and positioning of targets in an irradiation installation equipped with an access lock of axis $Z_3Z_4$ and within which there is a high vacuum, said installation being located in a protective enclosure defined by a shielded wall, wherein it comprises a telescopic assembly of axis $X_1X_2$ located within the protective enclosure, the telescopic assembly comprising a free end able to carry the target to be positioned and being located on a support, which can be given a movement enabling it to move between a first target handling position in which the satisfactory operation of its components can be checked and a second position in which the $X_1X_2$ axis of the telescopic assembly coincides with the $Z_3Z_4$ axis of the access lock and the free end introduced into the lock.

According to a first embodiment of the invention, the target to be irradiated is manually handled prior to its irradiation. The operators can enter the interior of the protective enclosure and manually place the target to be irradiated on the free end of the telescopic assembly. After installing the target, the operator leaves the protective enclosure. By means of the support, the telescopic assembly is displaced between the initial position, called the first position involving the manipulation of the target and the checking of the satisfactory operation of its components and a second position in which the $X_1X_2$ axis of the telescopic assembly is aligned with the $Z_3Z_4$ axis of the access lock of the irradiation installation. The telescopic assembly is then extended for introducing the free end of the said assembly into the lock.

After irradiation, it is no longer possible for the operators to enter the protective enclosure due to the activity of the irradiated target. The apparatus according to the invention makes it possible to pick up the target within the lock of the irradiation installation, move the telescopic assembly from the second position into the first position and deposit the irradiated target in a storage container for irradiated targets, such as a protective casket. Once the target has been placed in the protective casket, the operators can again enter the protective enclosure and remove the casket.

However, in order to enable the operators to work in such a way that they are completely protected from irradiation, the apparatus for transferring and positioning the targets to be irradiated according to the invention preferably comprises, according to a second embodiment, a tight, shielded handling enclosure positioned against the outer face of the shielding of the protective enclosure and connected to the latter by a sealable connecting pipe, an end fitting whose free end is engaged in the connecting pipe, said free end having sealing means able to cooperate with complementary sealing means carried by the free end of the telescopic assembly, the other end of the end fitting being equipped with retractable closure means, which are retracted when the sealing means carried by the free end of the end fitting and those carried by the free end of the telescopic assembly cooperate, the axis $X_1X_2$ of the telescopic assembly coinciding with the axis $Z_1Z_2$ of the connecting pipe when the telescopic assembly is located in the first position, thus permitting the positioning of the target on the free end of the telescopic assembly from the interior of the enclosure.

According to an advantageous embodiment of the invention, the support of the telescopic assembly is able to pivot about its vertical axis, remotely controllable motor means being provided on the one hand to bring the telescopic assembly from the first position to the second position and vice versa by rotation about said axis and on the other hand to bring the telescopic assembly from the retracted position into the extended position and vice versa.

According to another advantageous embodiment of the invention, the telescopic assembly is arranged in such a way that its free end carrying the target can be given a rotary movement about the horizontal axis of the assembly.

According to another advantageous embodiment of the invention, the telescopic assembly comprises two coaxial tubes at the common free end of which is positioned the target and which permit the circulation of a target cooling liquid.

BRIEF DESCRIPTION OF THE DRAWINGS

Other features of the invention which are preferably used at the same time as those referred to hereinbefore can be gathered from the following description of a non-limitative, but advantageous embodiment of the installation and positioning means and with reference to the attached drawings, wherein show.

DETAILED DESCRIPTION OF THE PREFERRED EMBODIMENT

Figure 1:
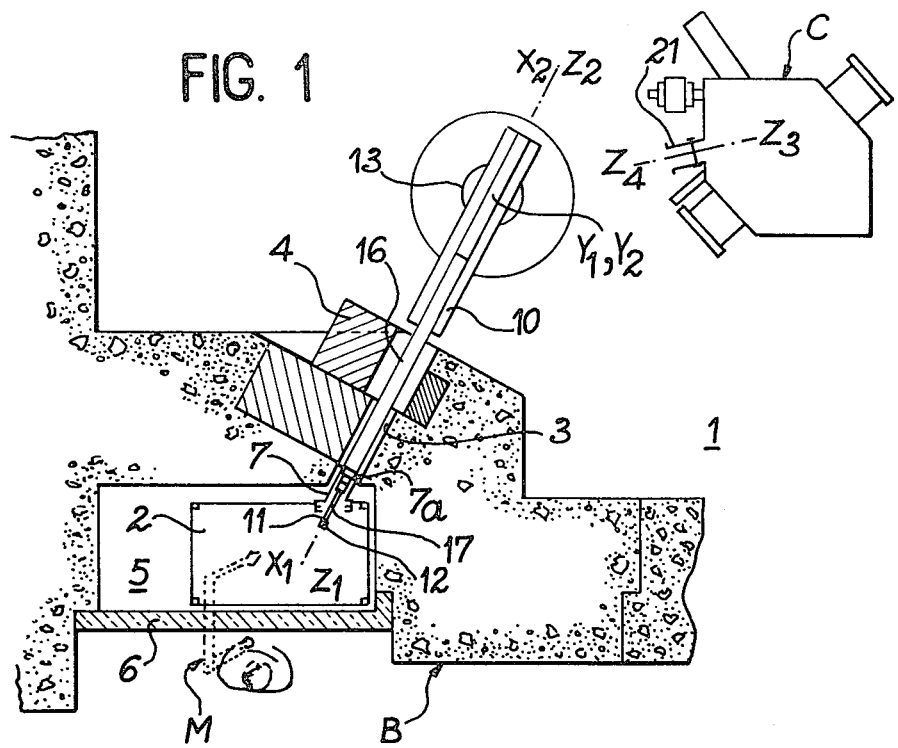
FIG. 1 a diagrammatic overall plan view showing the installation and extended positioning means in a first position.

As can be seen in FIGS. 1 to 4, a cyclotron diagrammatically designated as C is located within a room 1 surrounded by shielding B, e.g. of concrete, a shielded enclosure 2, called the handling or manipulation enclosure being positioned in the vicinity of one outer face of shielding B and linked with room 1 by means of a pipe 3 of axis $Z_1Z_2$, which can be sealed for example by means of a retractable shielded door 4. When door 4 is in the retracted position shown in FIG. 1, means for positioning the target to be irradiated, which will be described in greater detail hereinafter, can be introduced into enclosure 2.

Enclosure 2 is located within a space 5 defined by shielding B and by a transparent shielding wall 6, e.g. made from lead glass. It is equipped with remotely controllable means or remote manipulators M, which are known per se and enable an operator working outside the enclosure and the room to install a target and recover the latter after irradiation, as well as to check the satisfactory operation of the components of the positioning means. Thus, the operator outside both room 1 and enclosure 2 is protected by shielding B and wall 6.

The targets to be irradiated are preferably introduced into the handling enclosure 2 by pneumatic transfer. The irradiated targets are extracted therefrom in the same way.

Figure 6:
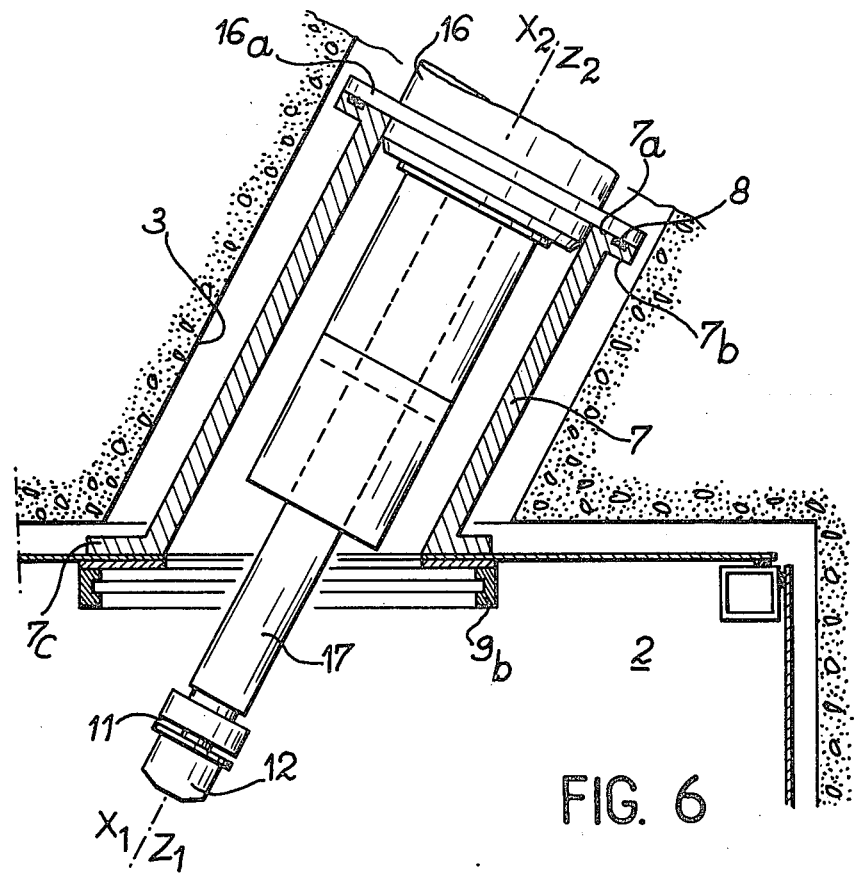
FIGS. 6 and 7 a larger scale view showing details of the installation and the positioning means.

Enclosure 2 has an end fitting 7, whose free end 7a can be engaged in the manner shown in greater detail in FIG. 6, in a pipe 3. The said free end has sealing means, constituted for example by a flange 7b provided with an O-ring 8, which can cooperate with complementary means carried by the means for supporting the target described hereinafter. As the other end 7c of the end fitting is equipped with retractable closing means, e.g. of the tight guillotine door type 9a, diagrammatically shown in FIG. 2. Door 9a is carried by a frame 9b shown in FIG. 6 and is retracted when O-ring 8 and the sealing means carried by the target support means cooperate.

These target support means are constituted by a telescopic assembly 10 of horizontal axis $X_1X_2$, whose free end 11 carries a target 12.

Assembly 10 is carried by a support 13 which can in particular bring it from a first position in which target 12 is located in handling enclosure 2 where it can be installed and recovered after irradiation and in which the satisfactory operation of its components can be checked, to a second position in which it cooperates with the cyclotron C and vice versa. In the present embodiment, support 13 pivots about a vertical axis $Y_1Y_2$. Rotation about said axis of the first remotely controllable motor means 14 in FIG. 5 make it possible to bring assembly 10 from the first position into the second position and vice versa.

According to variants which are not described in detail, assembly 10 is brought from the first position to the second and vice versa by a translation movement in a horizontal plane or in a vertical plane or by another pivotal movement, especially about a horizontal axis or by a complex movement resulting from the combination of at least some of the aforementioned movements.

Figure 2:
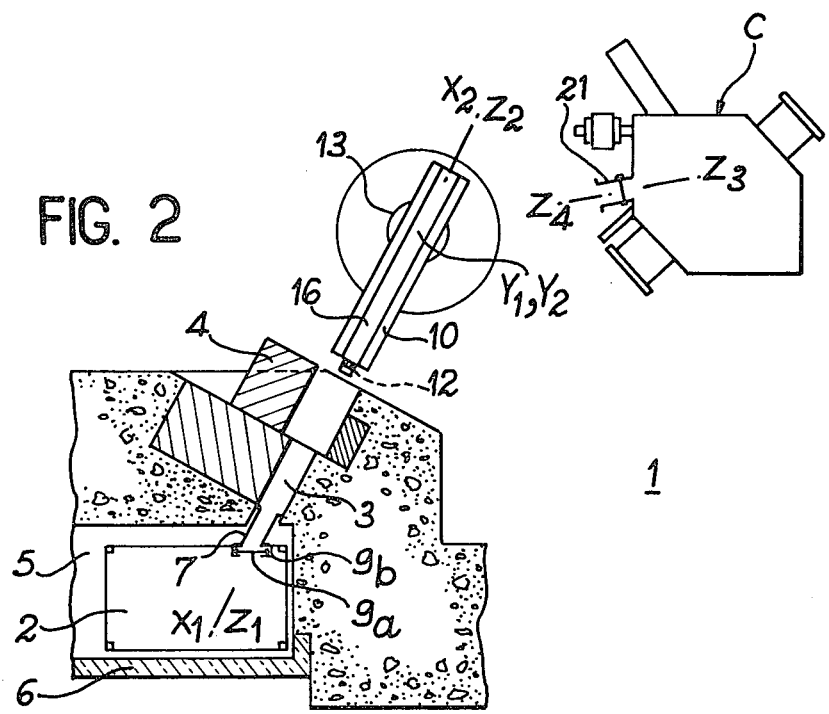
FIGS. 2, 3 and 4 respectively the retracted positioning means in the first position, the retracted positioning in a second position and the extended positioning means in the second position.
Figure 3:
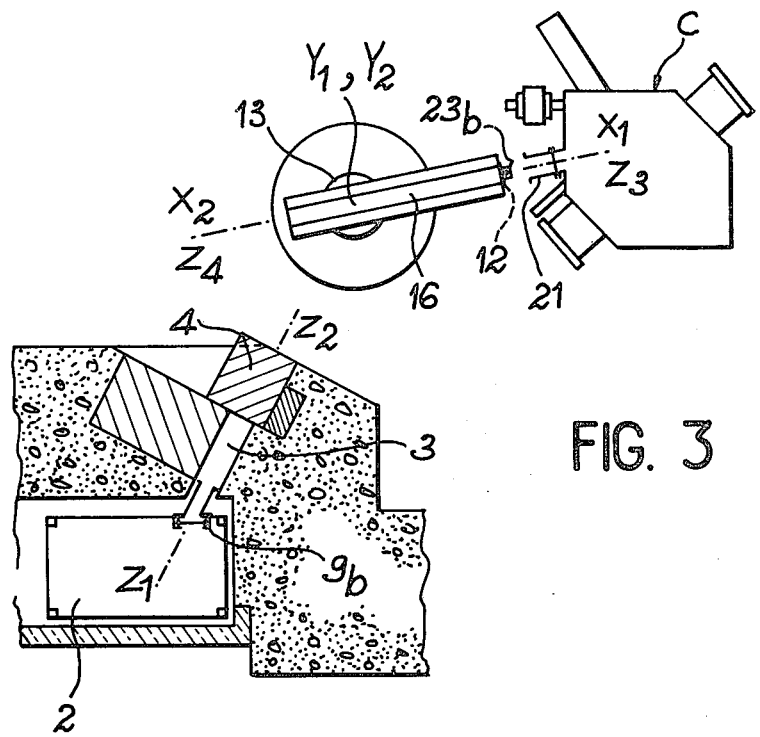
Figure 4:
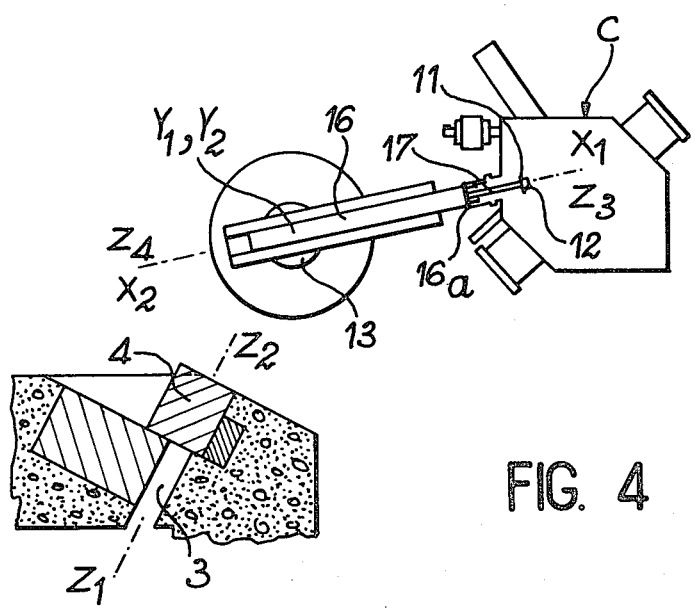
Figure 5:
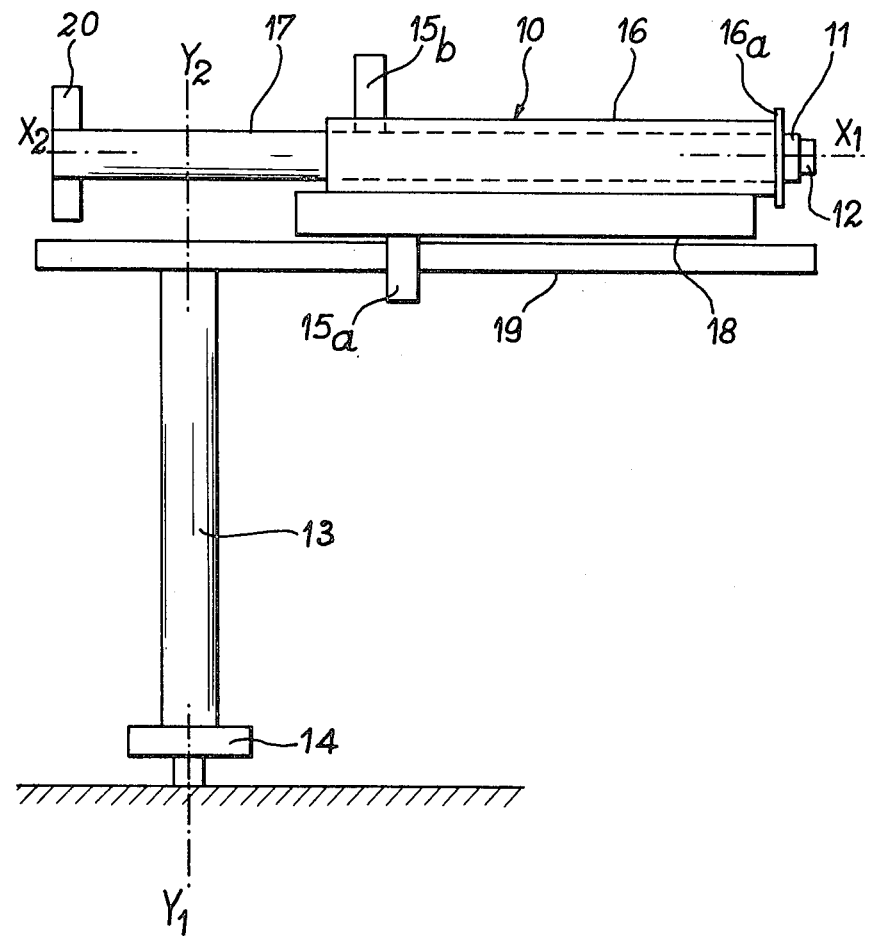
FIG. 5 a larger scale elevation diagrammatically showing details of the positioning means.

Second remotely controllable motor means 15a and 15b in FIG. 5 make it possible to bring assembly 10 from the retracted position shown for example in FIGS. 2 and 3 to the extended position shown for example in FIGS. 1 and 4.

Assembly 10 comprises an outer tubular member 16 coaxial with an inner tubular member 17. Member 16 comprises the aforementioned sealing means, e.g. a flange 16a of assembly 10, which must in particular cooperate with end fitting 7. Assembly 10 is carried by a carriage 18 movable along a rail 19 in accordance with axis $X_1X_2$ by motor means 15a.

Member 17 is displaceable within member 16 with respect to the latter and along axis $X_1X_2$ by motor means 15b. Motor means 15a, 15b can be of the electric motor type. Inner tubular member 17 has end 11 on which is placed target 12.

The telescopic assembly 10 is advantageously arranged in such a way that the free end 11 carrying target 12 can be rotated about axis $X_1X_2$. To this end, it is possible to provide motor means diagrammatically indicated at 20 and able to impart a rotary movement about axis $X_1X_2$ to member 17, thus permitting rotary irradiation. Motor means 20 also makes it possible to bring end 11 into a given angular position about axis $X_1X_2$ and to maintain it there in the case of an irradiation on a fixed target.

Advantageously, member 17 is constituted by two coaxial tubes, which are not shown in detail and which permit the circulation of a cooling liquid for target 12.

Advantageously, the said first position of support 13, which corresponds to a first angular position about axis $X_1Y_2$ is such that axis $Y_1X_2$ coincides with axis $Z_1Z_2$ of pipe 3. In this way, it is possible to bring end 11 into enclosure 2 in the extended position of assembly 10 and to bring said end into room 1 in the retracted position of assembly 10.

Said second angular position of support 13 about $Y_1Y_2$ is such that axis $X_1X_2$ coincides with axis $Z_3Z_4$ of an access lock 21 of the cyclotron, diagrammatically shown in FIGS. 1 to 4. In this angular position, with assembly 10 in the extended position, end 11 is located within cyclotron C.

The passage of assembly 10 from its retracted position into its extended position takes place in two successive movements. In the first of these movements and relative to the first angular position of assembly 10, tubular member 16 is brought from the position shown in FIG. 3 into a position such that flange 16a is placed against flange 7b comprising O-ring 8. With respect to the second annular position of assembly 10, the first aforementioned movement is such that flange 16a is brought into contact with a flange 21a of lock 21 and said flange 21a can also comprise an O-ring 8a. It is pointed out that the contact between flanges 16a and 21a can be improved by remotely controllable gripping means 22, which are known per se and not described in detail. For example, three such means are provided at an angle of 120° with respect to one another about axis $Z_3Z_4$.

In the second of these movements, member 17 is moved along $X_1X_2$ in such a way that its end 11 is brought into enclosure 2 with respect to the first angular position and into the cyclotron in the second angular position.

In the first angular position, door 9a is retracted in the same way as door 4.

The operator located outside enclosure 2 can, by means of the remote manipulators M equipping enclosure 2, install or remove a target 12 and check the satisfactory operation of assembly 10, e.g. the possibility of rotating end 11, i.e. member 17 about axis $X_1X_2$ for the case where it is desired to perform a rotary irradiation of the target within the cyclotron in the second angular position of assembly 10.

Passage of assembly 10 from the extended position to the retracted position also takes place in two successive movements from the second to the first of the two aforementioned movements described in detail in connection with the passage from the retracted position into the extended position.

Advantageously, a protective member or cap is provided for target 12 which may only be uncovered when positioned within cyclotron C or enclosure 2.

Figure 7:
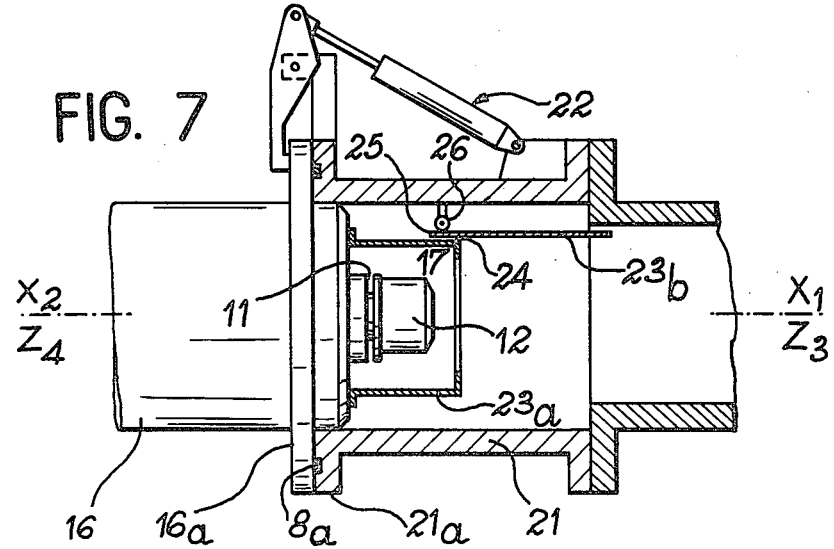

The protective member may be in the form of a tubular end fitting 23a of axis $X_1X_2$ carried by member 16 and which can be closed by a cover 23b tilting about an articulation 24 of horizontal axis perpendicular to $X_1X_2$, as shown in FIG. 7.

To bring about the opening and closing of cover 23b, the latter may have an extension 25 able to cooperate with a roller 26, whose axis is parallel to that of articulation 24 and which is carried by the inner wall of lock 21 at a position such that the interaction between roller 26 and extension 25 brings the cover from the vertical closure position into the horizontal open position when tubular member 16 is brought into contact with access lock 21 in the second angular position and at the end of the first passage movement from the retracted position into the extended position of assembly 10.

End fitting 7 has an equivalent roller to roller 26 for bringing about the opening of cover 23b when end 11 has to be brought into enclosure 2.

When the aforementioned first movement is performed in the reverse direction during the passage of assembly 10 into the retracted position, the cover 23b is closed at the end of interaction between roller 26 and extension 25.

The aforementioned installation and positioning means function in the following way.

Firstly, end 11 is brought into enclosure 2. To this end, assembly 10 is brought into its first angular position and, after opening the shielded door 4, the first extension movement brings member 16 into a sealing position against end fitting 7. The tight guillotine door 9a is then opened and at the end of the second extension movement of assembly 10 end 11 is positioned with enclosure 2, in the manner shown in FIG. 1.

Using the remote manipulators M the target to be irradiated is then placed on end 11. The satisfactory operation of the mechanism imparting the rotation to the target can be checked, followed by a sealing test of the target cooling system.

The second and then the first movement of assembly 10, formed in the reverse order, then bring the latter to the retracted position shown in FIG. 2.

At the end of the retraction movement of member 17 (movement in the opposite direction to the second extension movement of assembly 10) door 9a is closed again, reestablishing the tight seal in enclosure 2.

At the end of the retraction movement of member 16 (movement in the reverse direction to the first extension movement of assembly 10), assembly 10 is completely retracted and shielded door 4 is closed again, the target being located within its protective member 23a.

With the aid of motor means 14, assembly 10 is then brought into the second angular position shown in FIG. 3. The assembly is then extended to bring target 12 into the irradiation position within cyclotron C.

At the end of the first movement, member 16 is brought into a position of cooperation with lock 21, as described hereinbefore.

A pressure identical to that in the cyclotron chamber is then established within the lock, the sealing of the latter being ensured from the cyclotron side by a vacuum valve (not shown) and from the side of assembly 10 by the cooperation of flanges 16a and 21a, as described hereinbefore.

Once the correct pressure has been established in lock 21, the not shown vacuum valve is opened and, in connection with the second movement described hereinbefore, end 11 is brought into the irradiation position within the cyclotron chamber, as shown in FIG. 4.

At the end of irradiation, all the movements described hereinbefore are performed in the reverse order to bring end 11 into enclosure 2 for the purpose of recovering the irradiated target.

As a function of the adopted embodiment, an installation and positioning means such as described hereinbefore are obtained, whose characteristics and operation have already been adequately described and which in particular have the following advantages compared with the equivalent prior art means:

that of enabling operators to work protected from all irradiation that of permitting irradiation of both a fixed and a rotary target without changing components.

As is obvious and as can be gathered from what has been stated hereinbefore, the invention is not limited to the particular applications and embodiments described and in fact covers all variants thereof.

In particular, although the above description refers to an installation for irradiation by cyclotron, it is obvious that the invention more generally applies to an irradiation installation located within a protective enclosure into which a member is introduced and which is recovered after irradiation. In an even more general manner, the invention applies, outside the field of the nuclear industry, to the case of any random installation located within an enclosure protecting the operator against a hostile environment.

As has been stated hereinbefore, the use of a remote manipulator M and the handling enclosure 2 are not indispensible, although they enable operators to obtain protection against all irradiation. It is possible to envisage a manual manipulation of the target prior to its irradiation.

In this constructional variant of the invention, the operators must enter the protective enclosure. The first angular position then corresponds to a position for which the free end 11 of the telescopic assembly 10, which can not then be in the extended position, cooperates with an irradiated target storage container.

After irradiation, the irradiated target is transferred from the cyclotron, i.e. from the said secondary position, to the first position for deposition within the irradiated target storage container. Once the target has been sealed in this container, it is again possible for operators to enter the protective enclosure and remove storage container containing the target.

What is claimed is:

1. An apparatus for transferring and positioning a target in a highly evacuated irradiation installation including an access lock having an axis and which is secured to said highly evacuated irradiation installation, a shielded wall, said shielded wall defining a protective enclosure and said highly evacuated irradiation installation being positioned within said protective enclosure, comprising:
   a telescopic assembly having an axis and which is positioned within said protective enclosure and wherein said telescopic assembly further comprises a free end for carrying said target; and
   a support having mounted thereon said telescopic assembly and wherein said support further comprises means for extending and retracting said free end of said telescopic assembly into and out of said access lock and means for rotating said telescopic assembly to a first target handling position and a second target handling position such that in said first target handling position said telescopic assembly is operationally checked by actuating said means for extending and retracting said free end of said telescopic assembly into and out of said access lock and in said second target handling position said axis of said telescopic assembly is aligned with said axis of said access lock and said means for extending and retracting said free end of said telescopic assembly into and out of said access lock is actuated to extend said free end of said telescopic assembly into said access lock.

2. The apparatus as defined in claim 1 further comprising:
   sealing means integral with said telescopic assembly at a position near said free end;
   a tightly sealed handling enclosure disposed within said shielded wall against an outer face of said shielded wall;
   a sealable connecting pipe having an axis and which is disposed within said shielded wall, said sealable connecting pipe interconnecting said tightly sealed handling enclosure with said protective enclosure;
   retractable closure means; and
   an end fitting, said end fitting further comprising a free end engaged in said sealable connecting pipe, end fitting sealing means disposed on said free end for cooperation with said sealing means integral with said telescopic assembly at a position near said free end and a second end having connected thereto said retractable closure means such that when said telescopic assembly is in said first target handling position said axis of said telescopic assembly is aligned with said axis of said sealable connecting pipe, said end fitting sealing means cooperates with said sealing means integral with said telescopic assembly, and said retractable closure means is in a retracted position permitting the positioning of said target on said free end of said telescopic assembly from within said tightly sealed handling enclosure.

3. The apparatus as defined in claim 2 wherein said means for rotating said telescopic assembly further comprises first remotely controllable motor means and a pivot axis of said support, said first remotely controllable motor means rotating said telescopic assembly about said pivot axis of said support to said first target handling position and said second target handling position; and said means for extending and retracting said free end of said telescopic assembly further comprises second remotely controllable motor means for retracting and extending said telescopic assembly at said first target handling position and said second target handling position.

4. The apparatus as defined in claim 2 or 3 wherein said telescopic assembly further comprises means for rotating said target such that said target is rotated about said axis of said telescopic assembly.

5. The apparatus as defined in claim 2 wherein said telescopic assembly further comprises a first and second tube, said second tube being coaxially mounted with respect to said first tube to define a passage therebetween, said first and said second tube having a common free end for positioning said target thereon such that a target cooling liquid is circulated in said passage to cool said target.

* * * * *